United States Patent
Ishida et al.

(10) Patent No.: US 7,055,565 B2
(45) Date of Patent: Jun. 6, 2006

(54) RUNFLAT TIRE SYSTEM AND SUPPORT RING THEREFOR

(75) Inventors: Takaaki Ishida, Kobe (JP); Masatoshi Tanaka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/022,825

(22) Filed: Dec. 28, 2004

(65) Prior Publication Data

US 2005/0167018 A1 Aug. 4, 2005

(30) Foreign Application Priority Data

Feb. 2, 2004 (JP) ............................. 2004-025784

(51) Int. Cl.
*B60C 17/04* (2006.01)
*B60C 17/06* (2006.01)
(52) U.S. Cl. ...................................... 152/158; 152/520
(58) Field of Classification Search ................ 152/158, 152/520, 5, 7, 11, 12
See application file for complete search history.

(56) References Cited

U.S. PATENT DOCUMENTS

| | | | |
|---|---|---|---|
| 5,891,279 A | 4/1999 | Lacour | |
| 6,415,839 B1 | 7/2002 | Pompier et al. | |
| 6,564,842 B1 * | 9/2002 | Abinal et al. | 152/520 X |
| 2001/0052378 A1 | 12/2001 | Masson et al. | |
| 2004/0244892 A1 * | 12/2004 | Ishida et al. | 152/158 |

FOREIGN PATENT DOCUMENTS

| | | | |
|---|---|---|---|
| JP | 03082601 A | * | 4/1991 |
| WO | WO 94/13498 A1 | | 6/1994 |
| WO | WO 00/76791 A1 | | 12/2000 |

\* cited by examiner

*Primary Examiner*—Adrienne C. Johnstone
(74) *Attorney, Agent, or Firm*—Birch, Stewart, Kolasch & Birch, LLP

(57) ABSTRACT

A runflat tire system which comprises a wheel rim, a pneumatic tire and a support ring is disclosed. The support ring comprises a radially inner annular portion, a radially outer annular portion, and a supporting wall extending from the inner annular portion to the outer annular portion, wherein the supporting wall comprises a main wall extending continuously in the circumferential direction in a trapezoidal waveform, and axial walls extending axially outwardly from the main wall.

12 Claims, 5 Drawing Sheets

RUNFLAT TIRE SYSTEM AND SUPPORT RING THEREFOR

BACKGROUND OF THE INVENTION

The present invention relates to a runflat tire system, more particularly to a support ring mounted on a wheel rim to support the inside of the tread portion of the deflated tire.

Heretofore, various runflat tire systems by which, even if the tire goes flat, it is possible to travel for a practical long distance have been proposed. For example, the Japanese patent application publication NOS. 8-504389 (WO 94/13498 A1), 10-6721 (U.S. Pat. No. 5,891,279 A), 2001-354002 (U.S. Pat. No 6,415,839 B1) and 2003-502200 (WO 00/76791 A1) disclose such techniques, and nowadays, the runflat distance reaches to several hundred kilometers even under a relatively high running speed of up to about 80 km/hr. However, when seeking such a long runflat distance, not a little increase in the vehicles' wheel weight was inevitable because an increase in the material thick is necessary in order to increase the durability and strength.

Therefore, the inventors made a study on the shape or configuration of the support ring which can derive maximum durability and thus maximum runflat distance therefrom using a minimum material to reduce the wheel weight, and it was discovered that, by providing a radially-extending load-supporting wall with a special configuration, the buckling strength thereof is remarkably increased.

BRIEF SUMMARY OF THE INVENTION

It is therefore, an object of the present invention to provide a runflat tire system and a support ring, in which, by increasing the buckling strength of the load-supporting wall, the durability of the support ring is improved with a minimum material, and thus, not only safe and long distance traveling is possible under runflat mode, but also adverse effects due to an increased weight on dynamic characteristics under normal running mode especially under high speed running can be minimized.

According to the present invention, a runflat tire system comprises a wheel rim, a pneumatic tire mounted on the wheel rim, and a support ring mounted on the wheel rim to support the inside of a tread portion of the deflated tire, wherein the support ring comprises: a radially inner annular portion seated on a mounting portion of the wheel rim; a radially outer annular portion for supporting the inside of the tread portion; and a supporting wall extending from the inner annular portion to the outer annular portion, the supporting wall comprises: a main wall extending continuously in the circumferential direction in a trapezoidal waveform; and axial walls extending axially outwardly from the main wall, the main wall is made up of: first circumferential walls on one side of the center line of the inner annular portion; second circumferential walls on the other side of the center line; and first oblique walls and second oblique walls extending between the first circumferential walls and second circumferential walls, the first oblique walls and second oblique walls are disposed alternately in the circumferential direction, and with respect to the circumferential direction, the first oblique walls are inclined toward the opposite direction to that of the second oblique walls, and the axial walls are first axial walls extending axially outwardly from both ends of each of the first circumferential walls, and second axial walls extending axially outwardly from both ends of each of the second circumferential walls.

BRIEF DESCRIPTION OF THE DRAWING

Embodiments of the present invention will now be described in detail in conjunction with the accompanying drawings.

FIG. 2($b$) is a cross sectional view of the same assembly showing a deflated state of the tire.

FIG. 8($b$) is a partial cross sectional view thereof taken along line A—A in FIG. 8($b$).

DETAILED DESCRIPTION OF THE INVENTION

Figure 1:
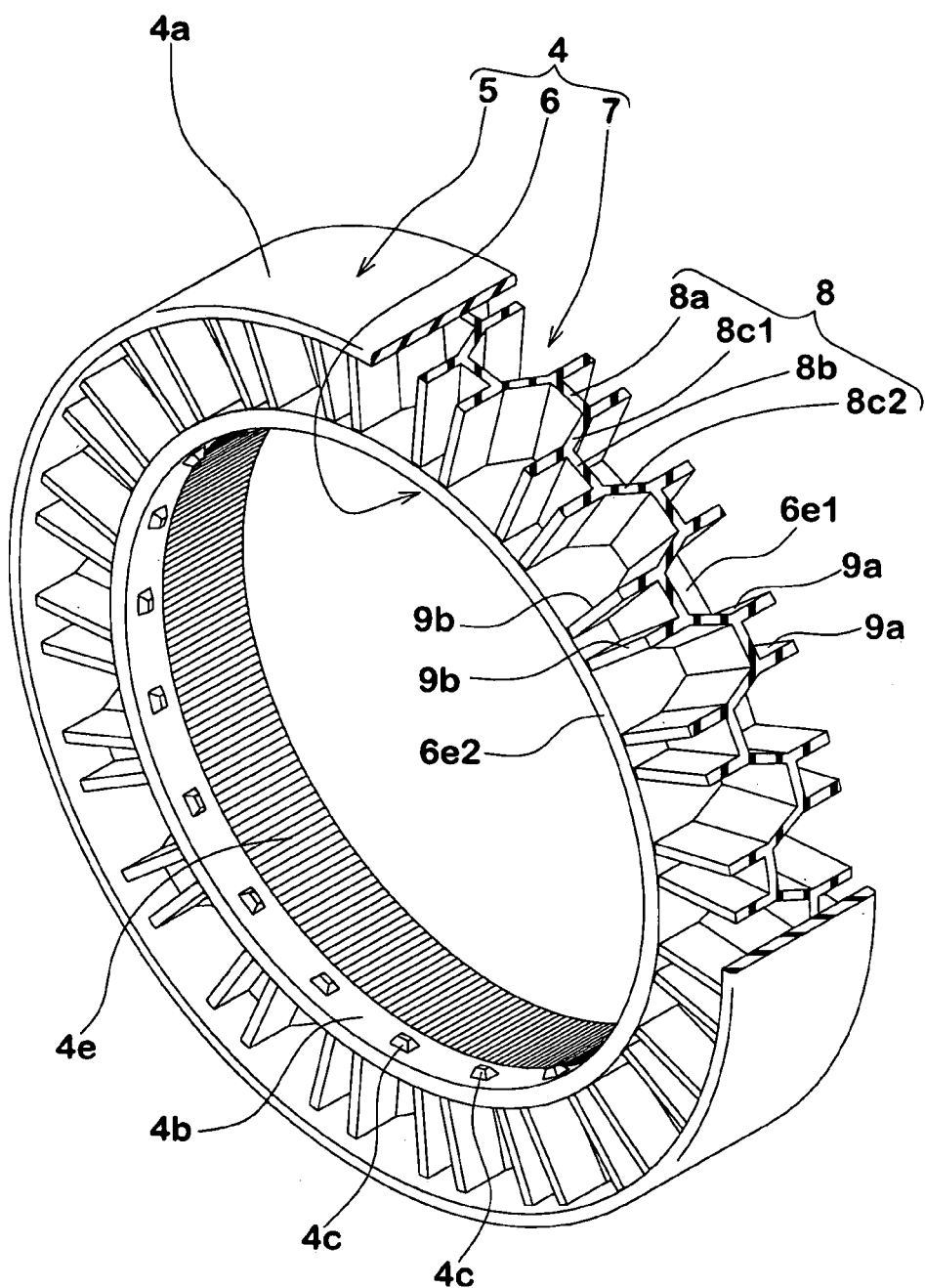
FIG. 1 is a perspective view of a support ring according to the present invention.

In the drawings, runflat tire system 1 according to the present invention comprises a pneumatic tire 2, a wheel rim 3 on which the tire 2 is mounted, and a support ring 4 mounted on the wheel rim 3 and placed in the tire cavity (i) to support the inner surface of the tread portion of the deflated tire.

The pneumatic tire 2 has a low aspect ratio and comprises: a tread portion 2$a$; a pair of axially spaced bead portions (2$co$ and 2$ci$) each with a bead core 2$d$ therein; a pair of sidewall portions (2$bo$ and 2$bi$); a carcass 2$e$ extending between the bead portions through the tread portion and sidewall portions; and a tread reinforcing belt 2$f$ disposed on the radially outside of the carcass in the tread portion 2$a$.

The carcass 2$e$ comprises at least one ply of radially arranged cords extending between the bead portions 2$ci$ and 2$co$ through the tread portion 2$a$ and sidewall portions 2$bi$ and 2$bo$ and secured to the bead cores 2$d$.

The belt 2$f$ comprises at least two cross breaker plies made of steel cords and optional band ply.

In order to use the tire 2 without a tire tube, the inner surface of the tire is covered with air-impermeable rubber which is provided as so called inner liner or carcass ply topping rubber.

The wheel rim 3 comprises: a first bead seat 3$a$ with a flange for the bead portion 2$ci$; a second bead seat 3$b$ with a flange for the bead portion 2$co$; a rim well 3$d$ provided near to the second bead seat 3$b$ which is used when mounting the tire; a mounting portion 3$c$1 for the support ring 4 provided between the rim well 3$d$ and the first bead seat 3$a$; a circumferentially extending hump 3$c$3 formed along the axial edge of the mounting portion 3$c$1 on the rim well side; and a circumferentially extending groove 3$c$2 provided in the mounting portion 3$c$1 near the other axial edge of the mounting portion 3$c$1.

The mounting portion 3$c$1 has a substantially cylindrical surface, and the groove 3$c$2 and hump 3$c$3 are provided to prevent an axial displacement of the support ring 4.

The first and second bead seats 3a and 3b are tapered axially outwards contrary to the conventional wheel rims having bead seats tapered towards the axial center (tire equator). Further, their flanges are inclined axially outwards contrary to the conventional flanges whose main wall contacting with the bead are almost perpendicular to the axial direction. In this embodiment, as the inside diameter of the bead portion 2ci is smaller than that of the bead portion 2co, the first bead seat 3a is accordingly made smaller in diameter than the second bead seat 3b.

Figure 2A:
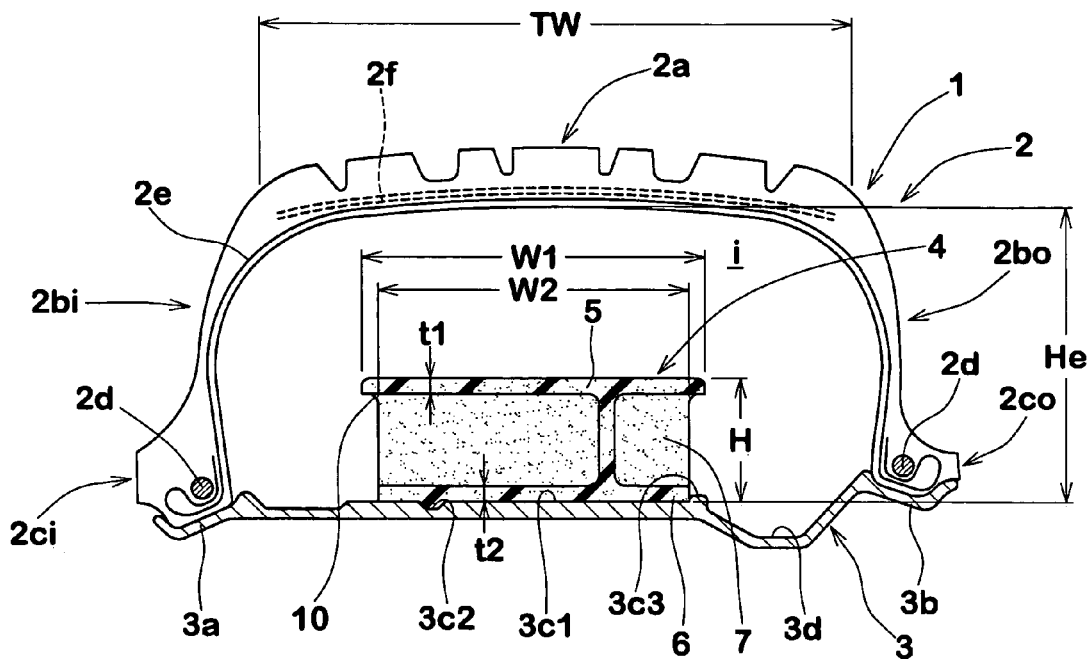
FIG. 2($a$) is a cross sectional view of an assembly of a pneumatic tire, wheel rim and support ring according to the present invention.
Figure 2B:
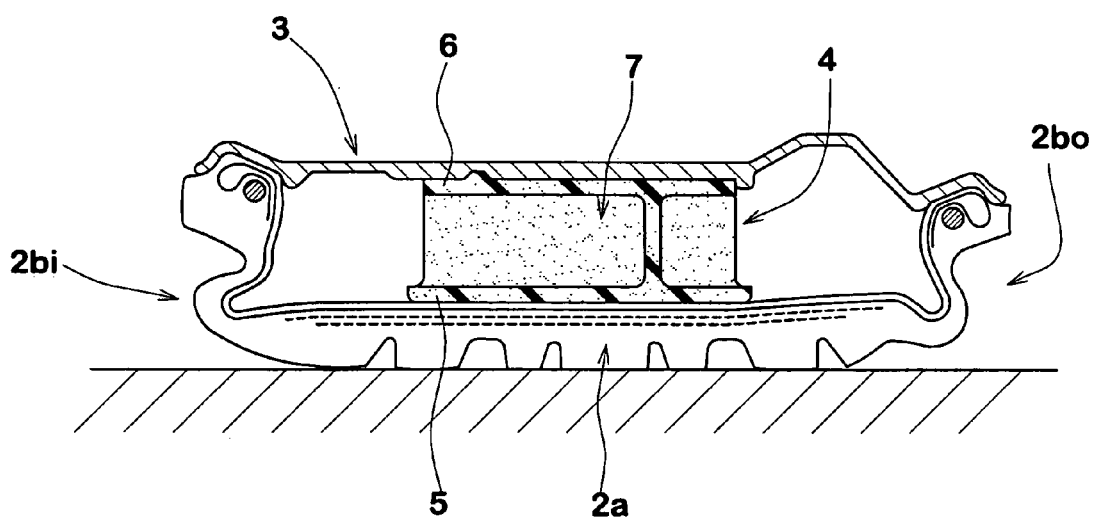
Figure 3:
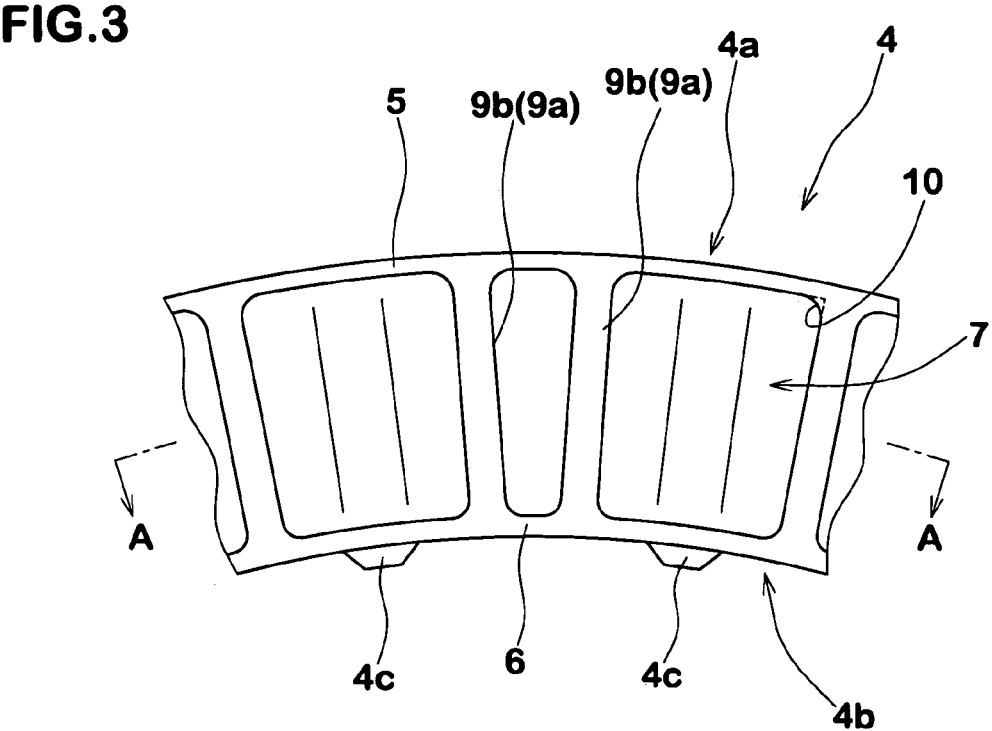
FIG. 3 is a partial side view of the support ring.

The support ring 4 comprises an annular body made of an elastic material and comprising: a radially inner annular portion 6 secured to the wheel rim 3; a radially outer annular portion 5 coming into contact with the inner surface of the tread portion when the tire goes flat as show in FIG. 2(b); and a supporting wall portion 7 bridging between the inner and outer annular portions 6 and 5.

Even under normally inflated conditions, the support ring 4 is very likely to come into collision with the inside of the tread portion 2a for example when running over a relatively large protrusion or running up against a curb. Therefore, the support ring should be made from a material having moderate flexibility. As to such as elastic material, rubber, resins such as polyurethane and EPDM or the like can be used. Especially, an elastic material having a hardness of from 45 to 60 degrees is preferred. Here, the hardness means the durometer type-D hardness measured according to Japanese Industrial standard JIS-K6253 at a temperature of 23±2 degrees C. Incidentally, the inner and outer annular portions 6 and 5 may be reinforced with fiber cords and/or fibers such as aromatic polyamide fiver, glass fiber, steel filament and the like. In this embodiment, the support ring 4 is formed as a casting of polyurethane.

To control heat generation, the loss tangent (delta) of the elastic material is preferably set in a range of from 0.02 to 0.08. Here, the loss tangent is measured with a viscoelastic spectrometer under the following conditions: temperature of 100 deg. C.; frequency of 10 Hz; and dynamic strain amplitude of 2%, according to the Japanese Industrial standard JIS-K-6394 "Testing method of dynamic properties for rubber vulcanized or thermoplastic".

If the radial height H of the support ring 4 is too high, the support ring is very liable to contact with the inside of the tread portion during normal running, and not only ride comfort but also steering stability and the like are deteriorated. If the radial height H is too low, under runflat mode, the sidewall portion is very likely to contact with the road surface and wear to decrease the durability and runflat distance, or as the vertical deflection of the tire increases and steering stability is lost and it becomes difficult to make a stable continue running. Therefore, the radial height H is set in a range of at least 35%, preferably more than 40%, but not more than 65%, preferably less than 58%, more preferably less than 50% of the cross-section height Ht of the tire cavity. The height H of the support ring 4 is a radial distance from the cylindrical surface of the mounting portion 3c1 to the radially outermost point of the outer circumferential surface 4a of the support ring 4. The height Ht of the tire cavity is a radial distance from the cylindrical surface of the mounting portion 3c1 to the radially outermost point of the inner surface of the tire inflated to a standard pressure but loaded with no tire load.

In order to improve the durability of the support ring and tire under runflat mode, preferably a lubricant is applied to the contact surface of the tire and/or support ring.

The outer annular portion 5 and inner annular portion 6 each have a cross sectional shape which is flat and long in the axial direction.

The thickness t1, t2 of the annular portion 5, 6 in the tire radial direction is set in a range of not less than 2.5 mm, preferably more than 3.0 mm, but not more than 7.0 mm, preferably less than 6.0 mm. In this embodiment, each thickness t1, t2 is substantially constant and the outer annular portion 5 is smaller in thickness than the inner annular portion 6. This is effective in improving dynamic characteristics and reducing the weight.

The axial width W1, W2 of the annular portion 5, 6 is set in the range of not less than 20%, preferably more than 30%, but not more than 80%, preferably less than 60% of the ground contacting width TW of the tire 2. Here, the ground contacting width TW is the axial width between the axially outermost edges of the ground contacting area of the tread portion of the tire inflated to a standard pressure and loaded with a standard load. If the width W1, W2 is less than 20% of the ground contacting width TW, it becomes difficult to provide necessary steering stability under runflat mode. Further, the engaging force between the support ring and wheel rim becomes insufficient. If the width W1, W2 is more than 80% of the ground contacting width TW, the support ring becomes difficult to mount, and the load capacity is not increased for the weight increase.

In order to improve the steering stability under runflat mode, in this embodiment, the outer annular portion 5 is made being wider than the inner annular portion 6. (W1>W2) The center of the width of the annular portion 5 is aligned with the center of the width of the annular portion 6. Preferably, the widths W1 and W2 are determined such that ½ of the difference between the widths W1 and W2 is not more than 2 times the thickness t1 of the outer annular portion 5, namely, $(W1-W2) \times 0.5) = < t1 \times 2$.

The inner diameter of the support ring 4 is set to be slightly smaller than the outer diameter of the mounting portion 3c1 so as to tightly fit the support ring to the mounting portion 3c1.

In this embodiment, the inner circumferential surface 4b of the support ring 4 is circumferentially intermittently provided with protrusions 4c to engage with the groove 3c2 of the rim to prevent axial displacement of the support ring. Instead of such a plurality of protrusions 4c, a single circumferentially extending continuous protrusion 4c may be provided. Further, in order to prevent rotation of the support ring around the wheel rim in use and make it easy to mount the support ring on the rim, the inner circumferential surface 4b is wholly or partially provided with axially extending serrations 4e having a sectional shape of a sawtooth appearance when viewed as a whole.

The above-mentioned supporting wall 7 is composed of a main wall 8 extending continuously in the circumferential direction in a trapezoidal waveform, and a plurality of axial walls 9 extending axially outwardly from the trapezoidal-wave-shaped main wall 8.

Figure 4:
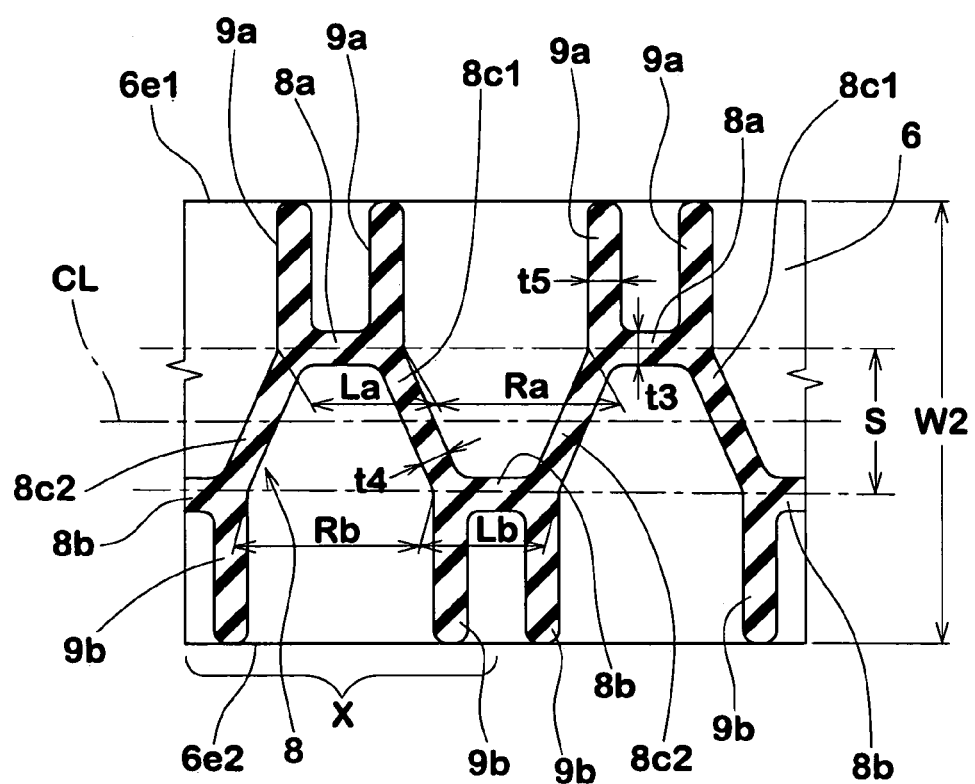
FIG. 4 is a partial cross sectional view thereof taken along line A—A in FIG. 3.

The trapezoidal main wall 8 is, as best shown in FIG. 4, made up of first circumferential walls 8a on one side of the center line CL, second circumferential walls 8b on the other side of the center line CL, first oblique walls 8c1, and second oblique walls 8c2.

The first circumferential walls 8a are arranged in line at an axial position on one side of the center line CL. The second circumferential walls 8b are also arranged in line at an axial position on the other side of the center line CL. The axial distance S between the circumferentially adjacent first and second walls 8a and 8b (from thickness center to thickness center) is preferably set in a range of from 30 to 40% of the width W2 of the inner annular portion 6. In other words, it is preferable that the axial width S of each oblique wall is about 30% to about 40% of the width W2.

As to the lengths La of the first walls 8a, the lengths Lb of the second walls 8b, the distances Ra between the adjacent first walls 8a, and the distances Rb between the adjacent second walls 8b, each in the circumferential direction, in this embodiment, all of the lengths La and Lb are the substantially same value, and also all of the distances Ra and Rb are the substantially same value. In this particular case, the distance Ra is larger than the length La, and the distance Rb is larger than the length Lb. Further, the ratio (Ra/La) and ratio (Rb/Lb) are preferably set in a range of not less than 1.5, more preferably more than 1.3, but not more than to 2.5, more preferably less than 2.2. Basically, however, it is preferable that with respect to a distance Ra and a length Lb which are in an opposite positional relationship as shown in FIG. 4, the distance Ra is larger than the length Lb, and also with respect to a distance Rb and a length La which are in an opposite positional relationship, the distance Rb is larger than the length La. Further, the ratio (Ra/Lb) and ratio (Rb/La) are preferably set in a range of not less than 1.5, more preferably more than 1.3, but not more than to 2.5, more preferably less than 2.2.

These parameters are very important parameters to determine the trapezoidal shape which can provide the main wall 8 with maximum strength because the above-mentioned ratios is the length ratio between the upper base and lower base of a trapezoid, and the distance S is the height of the trapezoid.

In this embodiment, the above-mentioned axial position of the first circumferential walls 8a and that of the second circumferential walls 8b are symmetrical about the center line CL. The first walls 8a and second wall 8b are staggered along the center line CL such that the middle points of the lengths La align with the middle points of the distances Rb, and the middle points of the lengths Lb align with the middle points of the distances Ra.

On the other hand, the first oblique walls 8c1 and second oblique walls 8c2 each extend between one of the first circumferential walls 8a and one of the second circumferential walls 8b, while inclining at a positive inclination angle with respect to the circumferential direction. The inclining direction of the first oblique walls 8c1 is opposite to that of the second oblique walls 8c2.

Thus, as shown in FIG. 4, the main wall 8 has a trapezoidal waveform configuration.

The oblique walls 8c1 and 8c2 each have a thickness t4 in a range of not less than 3 mm, preferably more than 5 mm, but not more than 15 mm, preferably less than 10 mm. Also the above-mentioned first and second circumferential walls 8a and 8b each have a thickness t3 in a range of not less than 3 mm, preferably more than 5 mm, but not more than 15 mm, preferably less than 10 mm.

In this embodiment, the thicknesses t3 of the first and second circumferential walls 8a and 8b and the thicknesses t4 of the first and second oblique walls 8c1 and 8c2 are the substantially same value.

The above-mentioned axial walls 9 are first axial walls 9a extending axially outwardly from both ends of each of the first circumferential walls 8a to one edge 6e1 of the inner annular portion 6, and second axial walls 9b extending axially outwardly from both ends of each of the second circumferential walls 8b to the other edge 6e2 of the inner annular portion 6.

The first and second axial walls 9a and 9b each have a thickness t5 in a range of not less than 3 mm, preferably more than 5 mm, but not more than 15 mm, preferably less than 10 mm. In this embodiment, the thicknesses t5 are the substantially same as the thicknesses t3 and t4.

In a cylindrical circumferential plane as shown in FIG. 4, the paired adjacent axial walls (9a and 9a), (9b and 9b) which extend from both ends of each of the circumferential walls 8a, 8b are parallel with the axial direction and thus parallel with each other. However, it is also possible that all of or some of the pairs are arranged such that the paired axial walls incline toward opposite directions with respect to the axial direction so as to increase the distance therebetween toward the axially outer ends thereof.

The supporting wall 7 is a repetition of small units. For example, a portion (x) shown in FIG. 4 can be-regarded as such a unit. Of course another definition is possible. In any case, the number of the units or the number of the repetitions is set in a range of from 20 to 30. If the number is more than 30, as the wall thicknesses t3, t4 and t5 decrease consequentially, the resistance to buckling strength becomes insufficient. If the number is less than 20, the wall thicknesses t3, t4 and t5 can be increased, but as the distances between the walls increase, in the loaded area, the distance from the center of load to each wall increases, and as a result the buckling resistance again decreases.

Figure 5:
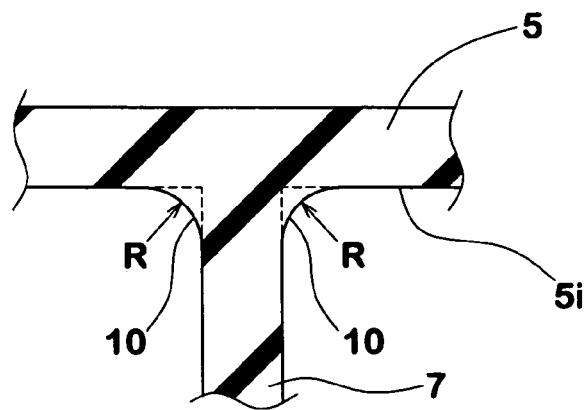
FIGS. 5, 6 and 7 are partial cross sectional views showing examples of the fillet surface.
Figure 6:
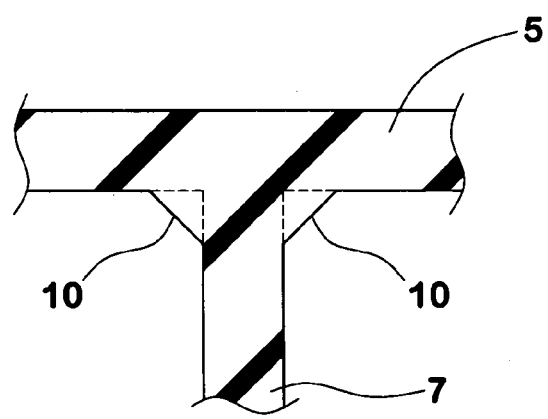
Figure 7:
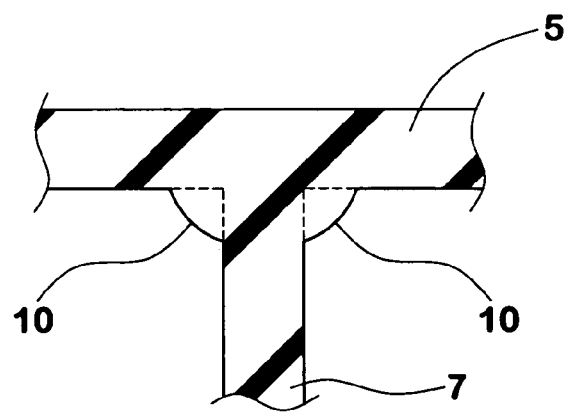

In this embodiment, further, the corner between the supporting wall 7 and the annular portion 5, 6 is preferably provided with a fillet surface 10 along the entire length of the corner, not to form an angled corner so as to further increase the buckling strength and to prevent a stress concentration and the occurrence of cracks and the like. In a cross section perpendicular to the extending direction of the corner, the fillet surface 10 in this embodiment is, as shown in FIG. 5, curved concavely so as to merge into the surface of the supporting wall 7 and the inner circumferential surface 5i of the outer annular portion 5 or the outer circumferential surface of the inner annular portion 6 (not shown in FIG. 5). Thus the surface is substantially a quarter circle. But, another shape—for example, a straight line (right-angled triangular cross sectional shape) as shown in FIG. 6; or a convex curve, e.g. a quarter circle or the like as shown in FIG. 7—can be used too.

Comparison Tests

Support rings of size 100–520(60) were made as an injection molding of polyurethane and tested for the runflat durability. Incidentally, the size 100–520(60) means that the nominal width, nominal diameter and radial height are 100 mm, 520 mm and 60 mm, respectively.

In the runflat durability test, the support ring was assembled as shown in FIGS. 2(a) and 2(b), and using a tire test drum having a diameter of 1.7 meter, the assembly was run at a speed of 80 km/hr under a tire load of 6.86 kN and a tire pressure of 0 kPa (valve core was removed), and the runflat distance, namely, the runnable distance to breakage of the support ring was measured as the durability. The results are shown in Table 1.

TABLE 1

Figure 8A:
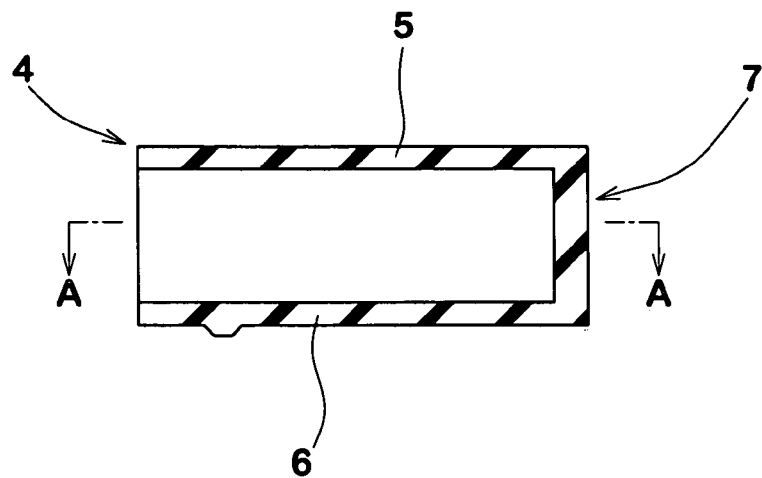
FIG. 8($a$) is a cross sectional view of a support ring according to a prior art taken along a plane including the rotational axis.
Figure 8B:
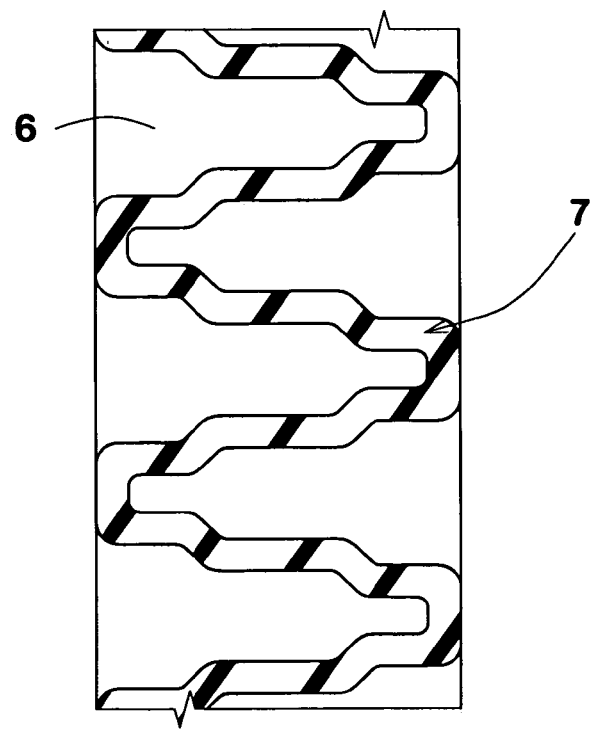

| Support ring Structure | Ref. FIG. 8(a,b) | Ex. 1 FIG. 1 | Ex. 2 FIG. 1 | Ex. 3 FIG. 1 | Ex. 4 FIG. 1 |
|---|---|---|---|---|---|
| Outer annular portion | | | | | |
| Thickness × Width (mm) | 4 × 100 | 4 × 100 | 3 × 100 | 4 × 108 | 4 × 108 |
| Inner annular portion | | | | | |
| Thickness × Width (mm) | 4 × 100 | 4 × 100 | 4 × 100 | 4 × 100 | 4 × 100 |
| Supporting wall | | | | | |
| Thickness (mm) | 7 | 7 | 7 | 7 | 7 |
| No. of repetition | 26 | 26 | 26 | 26 | 26 |
| Fillet surface Position | non | non | provided between Supporting wall and Outer annular portion | non | provided between Supporting wall and Outer annular portion |
| Shape | | | FIG. 5(R = 3 mm) | | FIG. 5(R = 3 mm) |
| Weight (kg) | 4.3 | 4.3 | 4.2 | 4.35 | 4.4 |
| Runflat distance (km) | 190 | 350 | 320 | 370 | 410 |
| per 1 kg wt. (km) | 44.2 | 81.4 | 76.2 | 85.1 | 93.2 |

Form the test results, it was confirmed that the runflat distance can be remarkably increased without increasing the weight.

The invention claimed is:

1. A support ring comprising
a radially inner annular portion seated on a mounting portion of a wheel rim,
a radially outer annular portion for supporting an inside of a tread portion of a deflated tire, and
a supporting wall extending from the inner annular portion to the outer annular portion, wherein
the supporting wall comprises
a main wall extending continuously in the circumferential direction in a trapezoidal waveform, and
axial walls extending axially outwardly from the main wall,
said main wall is made up of first circumferential walls on one side of the center line of the inner annular portion, second circumferential walls on the other side of the center line, and first oblique walls and second oblique walls extending between the first circumferential walls and second circumferential walls,
said first oblique walls and second oblique walls are disposed alternately in the circumferential direction, and with respect to the circumferential direction, the first oblique walls are inclined toward the opposite direction to that of the second oblique walls, and
said axial walls are first axial walls extending axially outwardly from both ends of each of the first circumferential walls, and second axial walls extending axially outwardly from both ends of each of the second circumferential walls.

2. The support ring according to claim 1, wherein with respect to each of trapezoids constituting the trapezoidal waveform, the height (S) in the axial direction is in a range of from 30 to 40% of the axial width (W2) of the inner annular portion.

3. The support ring according to claim 1, wherein with respect to each of trapezoids constituting the trapezoidal waveform, the height (S) in the axial direction is in a range of from 30 to 40% of the axial width (W2) of the inner annular portion, and the length ratio between the circumferentially extending upper base and lower base is in a range of from 1.3 to 2.5.

4. The support ring according to claim 3, wherein the length ratio is in a range of from 1.5 to 2.2.

5. The support ring according to claim 3, wherein the wave height (S) and wave pitch of the trapezoidal waveform are constant through the entire circumference.

6. The support ring according to any one of claims 1–5, wherein
the corner between the supporting wall and the inner annular portion is provided with a fillet surface.

7. The support ring according to any one of claims 1–5, wherein
the thickness of the outer annular portion is less than the thickness of the inner annular portion.

8. The support ring according to any one of claims 1–5, wherein
the thickness of the outer annular portion is less than the thickness of the inner annular portion, and
the corner between the supporting wall and the outer annular portion is provided with a fillet surface.

9. The support ring according to any one of claims 1–5, wherein
the axial width of the outer annular portion is more than the axial width of the inner annular portion,
the thickness of the outer annular portion is less than the thickness of the inner annular portion, and
the corner between the supporting wall and the outer annular portion is provided with a fillet surface.

10. The support ring according to any one of claims 1–5, wherein
the axial width of the outer annular portion is more than the axial width of the inner annular portion.

11. The support ring according to claim 1, wherein the supporting wall is symmetrical about the center in the widthwise direction thereof.

12. A runflat tire system comprising
a wheel rim,
a pneumatic tire mounted on the wheel rim, and
a support ring mounted on the wheel rim to support the inside of a tread portion of the deflated tire,
said support ring comprising a radially inner annular portion seated on a mounting portion of the wheel rim,
a radially outer annular portion for supporting the inside of the tread portion, and a supporting wall extending from the inner annular portion to the outer annular portion, wherein the supporting wall comprises a main wall extending continuously in the circumferential direction in a trapezoidal waveform, and axial walls extending axially outwardly from the main wall, said main wall is made up of first circumferential walls on one side of the center line of the inner annular portion, second circumferential walls on the other side of the center line, and first oblique walls and second oblique walls extending between the first circumferential walls and second circumferential walls, said first oblique walls and second oblique walls are disposed alternately in the circumferential direction, and with respect to the circumferential direction, the first oblique walls are inclined toward the opposite direction to that of the second oblique walls, and said axial walls are first axial walls extending axially outwardly from both ends of each of the first circumferential walls, and second axial walls extending axially outwardly from both ends of each of the second circumferential walls.

* * * * *